(12) United States Patent
Evans et al.

(10) Patent No.: US 8,775,506 B2
(45) Date of Patent: Jul. 8, 2014

(54) EAGER BLOCK FETCHING FOR WEB-BASED DATA GRIDS

(75) Inventors: James A. Evans, Burlington, MA (US); Hendrik van den Broek, Lexington, MA (US); Diar Ahmed, Walpole, MA (US)

(73) Assignee: Oracle International Corporation, Redwood Shores, CA (US)

( * ) Notice: Subject to any disclaimer, the term of this patent is extended or adjusted under 35 U.S.C. 154(b) by 488 days.

(21) Appl. No.: 13/276,892

(22) Filed: Oct. 19, 2011

(65) Prior Publication Data

US 2013/0103738 A1 Apr. 25, 2013

(51) Int. Cl.
*G06F 15/16* (2006.01)
*H04L 29/08* (2006.01)

(52) U.S. Cl.
CPC .... *H04L 29/08981* (2013.01); *H04L 29/08072* (2013.01)
USPC ............ 709/203; 709/220; 709/224; 717/124

(58) Field of Classification Search
CPC ...................... H04L 29/08072; H04L 29/0809
USPC ............................ 709/203, 220, 224; 717/124
See application file for complete search history.

(56) References Cited

U.S. PATENT DOCUMENTS

| | | | |
|---|---|---|---|
| 4,315,312 A | 2/1982 | Schmidt | |
| 5,701,461 A | 12/1997 | Dalal et al. | |
| 5,717,939 A | 2/1998 | Bricklin et al. | |
| 6,199,078 B1 | 3/2001 | Brittan et al. | |
| 6,204,846 B1 | 3/2001 | Little et al. | |
| 6,510,475 B1 | 1/2003 | Bennett | |
| 6,684,207 B1 | 1/2004 | Greenfield et al. | |
| 6,988,098 B2 | 1/2006 | Sonkin et al. | |
| 6,988,241 B1 | 1/2006 | Guttman et al. | |
| 7,480,675 B2 | 1/2009 | Folting et al. | |
| 7,735,023 B1 | 6/2010 | Chadzelek et al. | |

(Continued)

FOREIGN PATENT DOCUMENTS

WO WO 2009/094557 A2 7/2009

OTHER PUBLICATIONS

Google Docs, https://spreadsheets.google.com/, https://spreadsheets.google.com/ccc?key=0Ah2M26T0qsOPdG1JRWNVMmZYdldjandCY2ZpaW9IeHc&hl=en#gid=0, downloaded on Apr. 11, 2011, 1 page.

(Continued)

*Primary Examiner* — Khanh Dinh
(74) *Attorney, Agent, or Firm* — Kilpatrick Townsend & Stockton LLP (57) ABSTRACT

Techniques for improving scrolling performance in a web-based data grid. In one set of embodiments, when a user scrolls through a data grid rendered in a viewport of the user's web browser, client-side code executing in the web browser can detect whether a scroll event has occurred that requires a portion of the viewport to be filled/refreshed with data from a server. The client-side code can further determine whether the scroll event is a short scroll or a long scroll, and can send a request to the server that indicates the type of scroll event. If the scroll event is a short scroll, the server can determine a first amount of data to fetch based on one or more first parameters. If the scroll event is a long scroll, the server can determine a second amount of data to fetch based on one or more second parameters.

15 Claims, 9 Drawing Sheets

(56) References Cited

U.S. PATENT DOCUMENTS

| | | | |
|---|---|---|---|
| 7,870,283 B2 | 1/2011 | Sedlak et al. | |
| 7,930,646 B2 | 4/2011 | De Souza Sana et al. | |
| 8,533,306 B2* | 9/2013 | Nguyen et al. | 709/222 |
| 2005/0071785 A1 | 3/2005 | Chadzelek et al. | |
| 2005/0076015 A1 | 4/2005 | Dettinger et al. | |
| 2008/0244377 A1 | 10/2008 | Erwig et al. | |
| 2009/0044143 A1 | 2/2009 | Karstens | |
| 2010/0325606 A1 | 12/2010 | Sundararajan et al. | |
| 2013/0110993 A1* | 5/2013 | Liu et al. | 709/220 |
| 2013/0166702 A1* | 6/2013 | Sasatani | 709/220 |

OTHER PUBLICATIONS

ZK Spreadsheet Live Demo, http://zssdemo.zkoss.org/ downloaded on Apr. 8, 2011, 1 page.

BlueShoes JavaScript Spreadsheet Editor, http://www.blueshoes.org/en/javascript/spreadsheet/, downloaded on Apr. 8, 2011, 1 page.

COQsoft Editable JavaScript Tree Grid, http://www.treegrid.com/treegrid/www/, downloaded on Apr. 8, 2011, 1 page.

Grid / Virtual scrolling with client binding, http://demos.telerik.com/aspnet-ajax/grid/examples/client/virtualscrollpagingclientbinding/defaultcs.aspx, downloaded on Oct. 19, 2011, 4 pages.

<af:table>, http://download.oracle.com/docs/cd/E12839_01/apirefs.1111/e12419/tagdoc/af_table.html, downloaded on Apr. 26, 2011, 7 pages.

An Alternative to Pagination : Facebook and Twitter Style http://youhack.me/2010/05/14/an-alternative-to-pagination-facebook-and-twitter-style, downloaded on Apr. 26, 2011, 13 pages.

Virtual scrolling/paging, http://www.telerik.com/help/aspnet-ajax/grdvirtualscrollpaging.html, downloaded on Oct. 19, 2011, 5 pages.

* cited by examiner

EAGER BLOCK FETCHING FOR WEB-BASED DATA GRIDS

CROSS-REFERENCES TO RELATED APPLICATIONS

The present disclosure is related to the following commonly assigned, co-pending U.S. Patent Application, which is incorporated herein by reference in its entirety for all purposes: application Ser. No. 13/276,903, filed concurrently with the present application, entitled "ADAPTIVE NAVIGATION FUNCTIONALITY IN A WEB-BASED DATA ENTRY GRID."

BACKGROUND

The present disclosure relates in general to web applications, and in particular to techniques for optimizing scrolling performance in a web-based data grid.

With the ubiquity of web browsers and broadband Internet access, many types of software that previously existed only as traditional desktop applications are now available in web application form. Generally speaking, a web application is a software application that includes a server component and a client component, where the server component is hosted on a remote server (e.g., a web and/or application server) and the client component is rendered/executed in a common web browser. Examples of popular web applications include email, calendar, and so on.

Certain types of web applications, such as spreadsheets and other kinds of business applications, make use of a data grid for receiving and/or presenting data to a user. As used herein, a data grid is a UI component comprising a group of data cells that are arranged in a tabular or other similar format. Each cell in the grid can include editable or non-editable data. Data grids can be used to represent a number of different types of tabular data structures, such as flat tables, summary (e.g., pivot) tables, and the like.

In some cases, the size of a data set being presented in a web-based data grid can be so large that it cannot be viewed, in its entirety, within the visible window (i.e., viewport) allocated to the grid by a client web browser. In these cases, users of the data grid generally need to scroll through the grid in order to see all of the data. To conserve client side memory and to improve initial load time in these scenarios, some web applications implement a technique known as "virtualized scrolling." With this technique, only a portion of the data set (e.g., the data visible in the viewport) is retrieved from the server and stored by the client component. As a user scrolls through the data grid (thus changing the portion of the data set visible in the viewport), new blocks of data are fetched from the server by the client component to fill/refresh the viewport, and data that is no longer visible is discarded.

Web applications that implement virtualized scrolling typically maintain a single block size parameter that indicates the amount of data to fetch from the server by the client component when a user scrolls through the data grid. One issue with this approach is that a single block size is generally not optimal for all types of scroll events. For instance, a smaller block size might be preferable for "short scrolls"—i.e., scroll events where the user scrolls a few rows or columns, such that only a portion of the viewport needs to be filled with new data from the server. In contrast, a larger block size might be preferable for "long scrolls"—i.e., scroll events where the user scrolls a long distance from the original grid position, such that the entire viewport needs to be filled with new data from the server.

For example, consider a scenario where the user performs a long scroll. In response to the scroll event, the client component will request and receive a new data block, per the block size parameter, from the server. However, if the received data block is too small (e.g., not large enough to fill the entire viewport), the client component will need to fetch additional data blocks from the server in order to fill the remainder of the viewport. These multiple roundtrips between the client and server can be time-consuming and give the impression that the application is unresponsive to the user's scrolling commands.

BRIEF SUMMARY

Embodiments of the present invention provide techniques for optimizing scrolling performance in a web-based data grid. In one set of embodiments, when a user scrolls through a data grid rendered in a viewport of the user's web browser, client-side code executing in the web browser can detect whether a scroll event has occurred that requires a portion of the viewport to be filled/refreshed with data from a server. The client-side code can further determine whether the scroll event is a short scroll or a long scroll, and can send a data request to the server that indicates the type of scroll event. If the scroll event is a short scroll, the server can determine a first amount of data to fetch based on one or more first parameters. If the scroll event is a long scroll, the server can determine a second amount of data to fetch based on one or more second parameters (in addition to, or in lieu of, the one or more first parameters). The server can then transmit the first amount of data or the second amount of data to the client web browser.

With the mechanism above, the scrolling performance of the data grid can be optimized for both short scrolls and long scrolls. For example, the one or more first parameters can be configured such that the amount of data fetched in response to a short scroll is relatively small, thereby minimizing the delay associated with retrieving the data. At the same time, the one or more second parameters can be configured such that the amount of data fetched in response to a long scroll is sufficiently large to fill the entirety of the client viewport, thereby avoiding the need to perform multiple request/response roundtrips between the client and server.

In one set of embodiments, the one or more first parameters can specify a data block size (defined, e.g., in terms of cells of the data grid, such as J×K cells), and the one or more second parameters can specify the size of an array of data blocks (e.g., M×N blocks). Thus, in these embodiments, the amount of data fetched in response to a long scroll can be a multiple of the amount of data fetched in response to a short scroll. In an alternative set of embodiments, the one or more first parameters can specify a first data block size, and the one or more second parameters can specify a second data block size (i.e., a "megablock") that is greater than the first data block size. With either approach, the first parameters and second parameters can be configured and modified by one or more individuals (e.g., an administrator of the server and/or a developer of the application) to fine-tune scrolling performance.

According to one embodiment of the present invention, a non-transitory computer readable medium having stored thereon program code executable by a processor is provided. The program code comprises code that causes the processor to receive, from a client computer system, a request for data in response to a scroll event performed by a user of the client computer system with respect to a data grid, the request including an indication of whether the scroll event is a short scroll or a long scroll. If the scroll event is a short scroll, the program code comprises code that causes the processor to retrieve, in response to the request, a first amount of data based on one or more first parameters defining a predetermined block size. If the scroll event is a long scroll, the program code comprises code that causes the processor to retrieve, in response to the request, a second amount of data based on the one or more first parameters defining the predetermined block size and one or more second parameters defining a predetermined block array size.

In one embodiment, the data grid comprises a plurality of cells.

In one embodiment, the one or more first parameters define the predetermined block size as a set of J×K cells.

In one embodiment, the one or more second parameters define the predetermined block array size as a set of M×N blocks, each block comprising J×K cells.

In one embodiment, the code that causes the processor to retrieve the second amount of data based on the one or more first parameters and the one or more second parameters comprises code that causes the processor to determine a size of the second amount of data by multiplying the predetermined block size by the predetermined block array size, and code that causes the processor to retrieve the second amount of data based on the determined size.

In one embodiment, the request further includes a starting position for the data within the data grid.

In one embodiment, the data grid is a pivot table.

In one embodiment, the data grid is part of a web application.

According to another embodiment of the present invention, a method is provided that comprises rendering, by a client computer system, a data grid in a viewport of a web browser; detecting, by the client computer system, a scroll event performed by a user with respect to the data grid; determining, by the client computer system, that a first portion of the data grid visible in the viewport as a result of the scroll event needs to be populated with data from a server computer system; and determining, by the client computer system, whether the scroll event is a short scroll or a long scroll. The client computer system can then send, to a server computer system, a request for a data block for populating the first portion of the data grid, the request including an indication of whether the scroll event is a short scroll or a long scroll.

In one embodiment, determining whether the scroll event is a short scroll or a long scroll comprises determining whether any portion of the data grid visible in the viewport as a result of the scroll event overlaps one or more data blocks stored on the client computer system.

In one embodiment, the method further comprises determining that the scroll event is a short scroll if any portion of the data grid visible in the viewport as a result of the scroll event overlaps one or more data blocks stored on the client computer system, and determining that the scroll event is a long scroll if no portion of the data grid visible in the viewport as a result of the scroll event overlaps one or more data blocks stored on the client computer system.

In one embodiment, the viewport includes a horizontal scrollbar or a vertical scrollbar, and the scroll event is performed by operating the horizontal scrollbar or the vertical scrollbar.

According to another embodiment of the present invention, a system is provided. The system includes a processor configured to receive, from a client computer system, a request for data in response to a scroll event performed by a user of the client computer system with respect to a data grid, the request including an indication of whether the scroll event is a short scroll or a long scroll. If the scroll event is a short scroll, the processor is configured to retrieve, in response to the request, a first amount of data based on one or more first parameters defining a first predetermined block size. If the scroll event is a long scroll, the processor is configured to retrieve, in response to the request, a second amount of data based on one or more second parameters defining a second predetermined block size distinct from the first predetermined block size.

In one embodiment, the one or more first parameters define the first predetermined block size as a set of M×N cells and the one or more second parameters define the second predetermined block size as a set of J×K cells.

In one embodiment, the second predetermined block size is greater than the first predetermined block size.

A further understanding of the nature and advantages of the embodiments disclosed herein can be realized by reference to the remaining portions of the specification and the attached drawings.

DETAILED DESCRIPTION

In the following description, numerous details are set forth in order to provide an understanding of embodiments of the present invention. It will be apparent, however, to one of ordinary skill in the art that certain embodiments can be practiced without some of these details.

Embodiments of the present invention provide techniques for optimizing scrolling performance in a web-based data grid. In one set of embodiments, when a user scrolls through a data grid rendered in a viewport of the user's web browser, client-side code executing in the web browser can detect whether a scroll event has occurred that requires a portion of the viewport to be filled/refreshed with data from a server. The client-side code can further determine whether the scroll event is a short scroll or a long scroll, and can send a data request to the server that indicates the type of scroll event. If the scroll event is a short scroll, the server can determine a first amount of data to fetch based on one or more first parameters. If the scroll event is a long scroll, the server can determine a second amount of data to fetch based on one or more second parameters (in addition to, or in lieu of, the one or more first parameters). The server can then transmit the first amount of data or the second amount of data to the client web browser.

With the mechanism above, the scrolling performance of the data grid can be optimized for both short scrolls and long scrolls. For example, the one or more first parameters can be configured such that the amount of data fetched in response to a short scroll is relatively small, thereby minimizing the delay associated with retrieving the data. At the same time, the one or more second parameters can be configured such that the amount of data fetched in response to a long scroll is sufficiently large to fill the entirety of the client viewport, thereby avoiding the need to perform multiple request/response roundtrips between the client and server.

In one set of embodiments, the one or more first parameters can specify a data block size (defined, e.g., in terms of cells of the data grid, such as J×K cells), and the one or more second parameters can specify the size of an array of data blocks (e.g., M×N blocks). Thus, in these embodiments, the amount of data fetched in response to a long scroll can be a multiple of the amount of data fetched in response to a short scroll. In an alternative set of embodiments, the one or more first parameters can specify a first data block size, and the one or more second parameters can specify a second data block size (i.e., a "megablock") that is greater than the first data block size. With either approach, the first parameters and second parameters can be configured and modified by one or more individuals (e.g., an administrator of the server and/or a developer of the application) to fine-tune scrolling performance.

Figure 1:
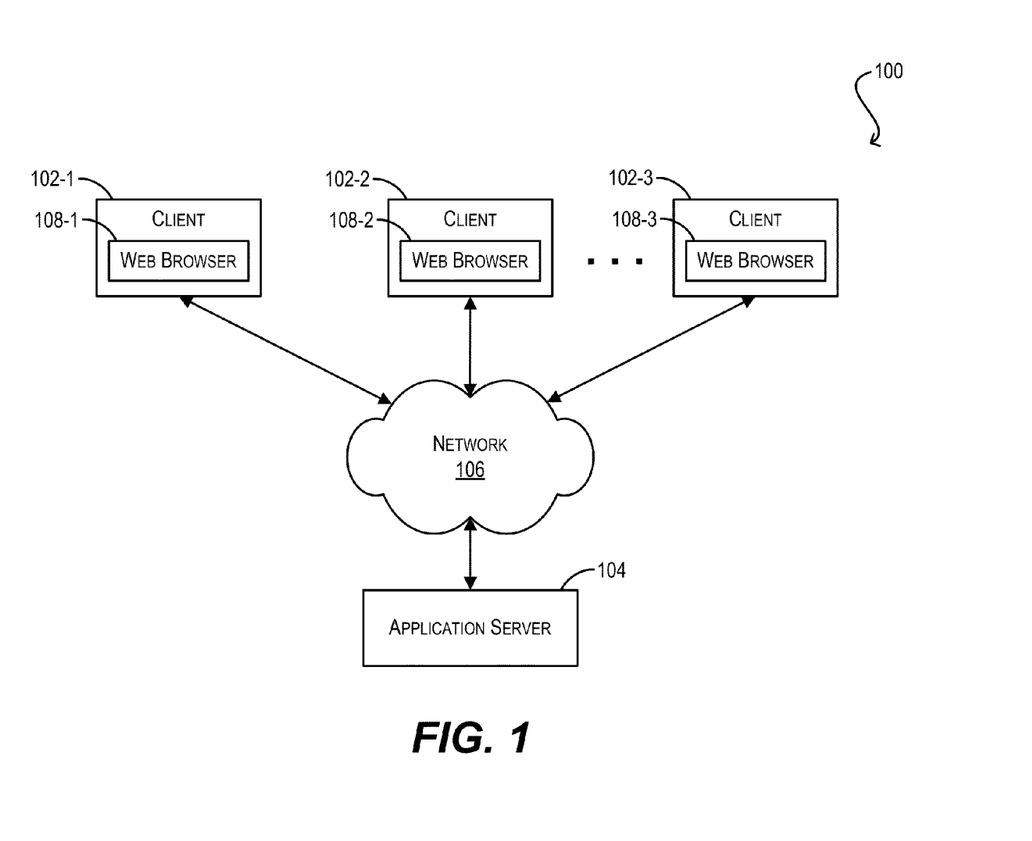
FIG. 1 is a simplified block diagram of a system environment in accordance with an embodiment of the present invention.

FIG. 1 is a simplified block diagram of a system environment 100 according to an embodiment of the present invention. As shown, system environment 100 can include a number of clients 102-1, 102-2, 102-3 that are communicatively coupled with an application server 104 via a network 106. Although FIG. 1 depicts three clients and one application server, any number of these entities can be supported.

Application server 104 is a software and/or hardware-based module that is configured to provide an environment in which the server component of a distributed (i.e., client-server) software application can be executed. For example, in one embodiment, application server 104 can receive a request from a client that is directed to an application hosted on server 104, process the request using business logic defined for the application, and then generate information responsive to the request for transmission to the client. Application server 104 can also provide additional services, such as clustering, load balancing, and automatic fail-over. Examples of commercially available application servers include Oracle WebLogic Server developed by Oracle, IIS Server developed by Microsoft, WebSphere Application Server developed by IBM, and SAP NetWeaver Application Server developed by SAP AG.

In certain embodiments, application server 104 can be configured to host one or more web applications. In these embodiments, application server 104 can incorporate a web server to handle the web-specific tasks of receiving Hypertext Transfer Protocol (HTTP) requests from clients and servicing those requests by returning HTTP responses. Alternatively, application server 104 can operate in conjunction with a web server that is physically or functionally separate from application server 104. For example, in one embodiment, application server 104 can interoperate with an instance of Oracle HTTP Server, a web server software application developed by Oracle Corporation.

Network 106 can be any type of network that supports data communications using a networking protocol such as TCP/IP, Ethernet, or the like. By way of example, network 106 can be a local area network (LAN), a wide-area network (WAN), a virtual network, such as a virtual private network (VPN), or the Internet. In certain embodiments, network 106 can comprise a collection of interconnected networks.

Clients 102-1, 102-2, 102-3 can each be a computing device such as a desktop computer, a laptop computer, a server computer, a network appliance, a gaming device, a personal digital assistant, a smartphone, a tablet, or the like. As shown in FIG. 1, each client 102-1, 102-2, 102-3 can be configured to include a web browser 108-1, 108-2, 108-3 respectively. Examples of commercially available web browsers include Internet Explorer developed by Microsoft, Firefox developed by Mozilla, Chrome developed by Google, and Safari developed by Apple.

In one set of embodiments, web browsers 108-1, 108-2, 108-3 can each execute the client component of a web application hosted on application server 104, thereby enabling users of clients 102-1, 102-2, 102-3 to interact with the application. In a particular embodiment, executing this client component in web browsers 108-1, 108-2, 108-3 can comprise rendering HyperText Markup Language (HTML) content that is received by the browsers from application server 104, receiving user input via one or more input controls, and transmitting the user input to application server 104. In a further embodiment, executing the client component can comprise running application code, such as JavaScript and/or a Java applet, that is received by web browsers 108-1, 108-2, 108-3 from application server 104.

In certain embodiments, the web application hosted on application server 104 (and presented on clients 102-1, 102-2, 102-3 via web browsers 108-1, 108-2, 108-3) can employ a web-based data grid—i.e., a UI component comprising a group of data cells that are arranged in a tabular or other similar format. In these embodiments, the client component executing on web browsers 108-1, 108-2, 108-3 can fetch data to be displayed in the data grid from application server 104 and then render the grid in the viewports of the respective browsers.

In a particular embodiment, the web application can implement a technique known as virtual scrolling. With this technique, only a portion of the data set in the data grid (e.g., the portion that is visible in the viewport of the client web browser) is locally stored on the client side. The remaining data can be retrieved on an "as needed" basis from application server 104. For example, as a user scrolls through the data grid (thus changing the portion of the data set visible in the viewport), new blocks of data can be fetched from server 104 to fill/refresh the viewport, and data that is no longer visible can be discarded.

As noted in the Background section, current web applications that implement virtualized scrolling typically maintain a single block size parameter that indicates the amount of data to fetch from the server when a user scrolls through the data grid. One issue with this approach is that a single block size is generally not optimal for all types of scroll events. For instance, a smaller block size might be preferable for "short scrolls"—i.e., scroll events where the user scrolls a few rows or columns, such that only a portion of the viewport needs to be filled with new data from the server. In contrast, a larger block size might be preferable for "long scrolls"—i.e., scroll events where the user scrolls a long distance from the original grid position, such that the entire viewport needs to be filled with new data from the server. If the block size is too small for the long scroll scenario (e.g., the block size is insufficient to fill the entire viewport), multiple roundtrips will be required between the client and server (one for each data block), which can be time-consuming and give the impression that the application is unresponsive to the user's scrolling commands.

Embodiments of the present invention address this problem (and other similar problems) by implementing logic to anticipate the amount of data that will be needed by the client from the server in response to a scroll event, thereby optimizing scrolling performance across a variety of different scenarios. In one embodiment, this logic can include determining, by the client component, whether a short scroll or a long scroll has occurred, and transmitting a data request to the server with an indication of the scroll event type.

The logic can further including determining, by the server, how much data to return to the client component based on the scroll event type. For example, if the scroll event is a short scroll, the server can determine, based upon one or more first parameters, that only a relatively small amount of data needs to be returned to the client component, thereby minimizing the delay associated with retrieving the data. If the scroll event is a long scroll, the server can determine, based upon one or more second parameters, that a larger amount of data needs to be returned to the client component (e.g., enough data to fill the entirety of the client viewport), thereby avoiding the need for multiple roundtrips between the client and server.

The specific processing that can be carried out by client web browsers 108-1, 108-2, 108-3 and application server 104 to implement this functionality is discussed with respect to FIGS. 2-4 below.

It should be appreciated that system environment 100 is illustrative and is not intended to limit embodiments of the present invention. For example, the various entities depicted in system environment 100 can have other capabilities or include other components that are not specifically described. One of ordinary skill in the art will recognize many variations, modifications, and alternatives.

Figure 2:
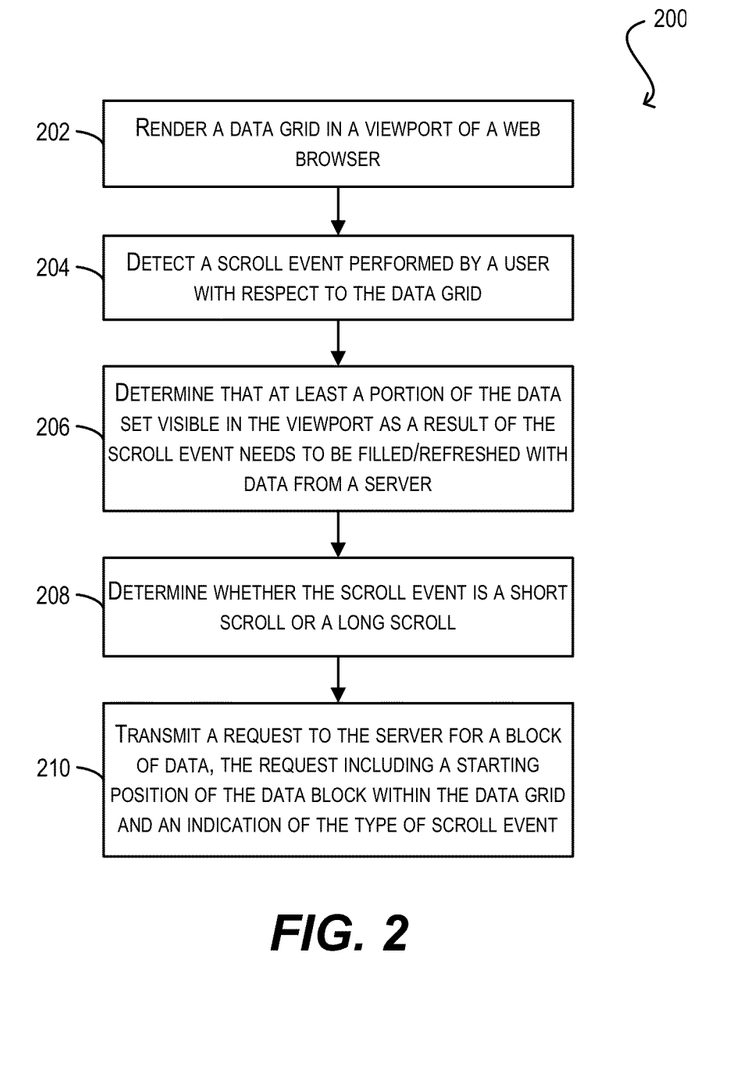
FIG. 2 is a flow diagram of a client-side process for optimizing scrolling performance of a web-based data grid in accordance with an embodiment of the present invention.

FIG. 2 is a flow diagram of a client-side process 200 for optimizing scrolling performance of a web-based data grid according to an embodiment of the present invention. In one set of embodiments, process 200 can be carried out by web browsers 108-1, 108-2, 108-3 of FIG. 1. For example, in certain embodiments, process 200 can be embodied in program code (e.g., JavaScript or Java code) that is transmitted by application server 104 to clients 102-1, 102-2, 102-3 for execution by web browsers 108-1, 108-2, 108-3. In these and other embodiments, the program code can be stored on a machine-readable storage medium.

At block 202, web browser 108-1, 108-2, or 108-3 can render, based on data retrieved from application server 104, a data grid in a viewport of the browser. In certain embodiments, the data set to be presented in the data grid can be so large that it cannot be viewed, in its entirety, within the browser viewport. In these embodiments, web browser 108-1, 108-2, or 108-3 can be configured to initially retrieve and store only a portion of the data set from application server 104 (e.g., the portion that is visible in the viewport). In addition, the viewport can be rendered with horizontal and/or vertical scrollbars, thereby enabling a user to scroll through the data grid.

At block 204, web browser 108-1, 108-2, or 108-3 can detect a scroll event that is performed by the user with respect to the data grid. As used herein, a scroll event is an event that causes the data grid to scroll in one or more directions within the viewport, and thus changes the portion of the data set that is visible in the viewport. In one set of embodiments, the scroll event can correspond to the movement/activation of one or more of the viewport scrollbars. Alternatively or in addition, the scroll event can correspond to other types of user input, such as the activation of a keyboard arrow key, single touch or multi-touch scrolling (in the case of a touchscreen UI), drag scrolling (i.e., where you mouseDown-drag-mouseUp to scroll), mouse wheel scrolling, and the like.

At block 206, web browser 108-1, 108-2, or 108-3 can determine that a portion of the data set visible in the viewport as a result of the scroll event needs to be filled/refreshed with data from the server. For example, assume that the web browser has cached a 10×10 data block for cells 1×1 to 10×10, and that cells 1×1 to 10×10 are visible in the viewport prior to the scroll event. Further assume that the scroll event causes the grid to scroll to the right by 5 cells, such that such that cells 5×1 to 15×10 are visible as a result of the scroll. Since the web browser has only cached data for cells 1×1 to 10×10, the browser can determine that it needs another block of data from application server 104 to fill in newly-visible cells 11×1 to 15×10.

Upon determining that additional data needs to be fetched as a result of the scroll event, web browser 108-1, 108-2, or 108-3 can determine whether the scroll event is a short scroll or a long scroll (block 208). In one set of embodiments, this can be performed by checking whether there is any overlap between the region the user has scrolled to and the blocks of data already on the client. If there is an overlap (indicating that some portion of the viewport can be filled in with locally-cached data), the event can be considered a short scroll. If there is no overlap (indicating that the entirety of the viewport needs to be filled in with new data from application server 104), the event can be considered a long scroll.

Once the type of scroll event is determined, web browser 108-1, 108-2, or 108-3 can transmit a request to application server 104 for a block of data, where the request includes a starting position of the block within the data grid and an indication of the type of scroll event (block 210). For example, in the scenario discussed with respect to block 206 above, the starting position of the requested data block would be 11×1 and the scroll event would be a short scroll (since visible cells 5×1 to 10×10 overlap with the 10×10 data block stored on the client-side). Using this information, application server 104 can determine an appropriate amount of data to return to the web browser in response to the request.

Figure 3:
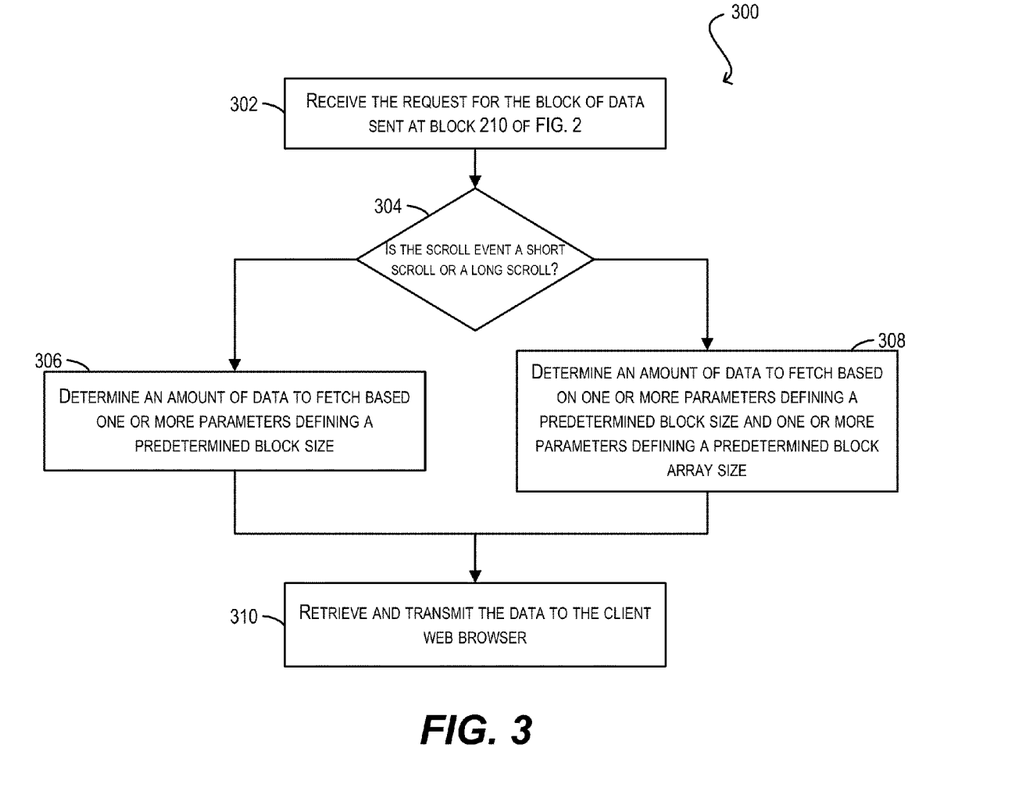
FIG. 3 is a flow diagram of a server-side process for optimizing scrolling performance of a web-based data grid in accordance with an embodiment of the present invention.

FIG. 3 is a flow diagram of a server-side process 300 for optimizing scrolling performance of a web-based data grid according to an embodiment of the present invention. In various embodiments, process 300 can be carried out in response to client-side process 200. In a particular embodiment, process 300 can be carried out by application server 104 of FIG. 1. Process 300 can be implemented in hardware, software, or a combination thereof. As software, process 300 can be encoded as program code that is stored on a machine-readable storage medium.

At block 302, application server 104 can receive the data block request sent by web browser 108-1, 108-2, or 108-3 at block 210 of FIG. 2. Application server 104 can then extract the information in the request and determine if the scroll event that occurred on the client-side is short scroll or a long scroll (block 304).

If the scroll event is a short scroll, application server 104 can determine an amount of data to fetch based on one or more parameters defining a predetermined data block size (block 306). The server can then return a single block of data corresponding to the predetermined data block size. For example, if the predetermined data block size is J×K cells, the amount of data to be fetched (starting from the starting position defined in the request) would have the dimensions of J×K cells. In various embodiments, the predetermined data block size is user-configurable and can be modified at runtime by, e.g., an administrator of application server 104 and/or at design time of the web application by, e.g., the application developer.

On the other hand, if the scroll event is a long scroll, application server 104 can determine an amount of data to fetch based on the one or more parameters defining the predetermined data block size, as well as one or more parameters defining a predetermined block array size (block 308). In this embodiment, application server 104 can determine the amount of data to fetch by multiplying the predetermined data block size with the predetermined block array size. For example, if the predetermined data block size is J×K cells and the predetermined block array size is M×N blocks, the amount of data to be fetched (starting from the starting position defined in the request) would have dimensions of (J times M)×(K times N) cells. Like the predetermined data block size, the predetermined block array size is user-configurable can be modified at runtime by, e.g., an administrator of application server 104 and/or at design time of the web application by, e.g., the application developer.

At block 310, application server 104 can retrieve the amount of data determined at block 306 or 308 and transmit the data to web browser 108-1, 108-2, or 108-3 for refreshing the client viewport.

It should be appreciated that processes 200 and 300 are illustrative and that variations and modifications are possible. For example, in certain embodiments, web browser 108-1, 108-2, or 108-3 can send data requests to application server 104 in contexts other than a scroll event. For instance, the web browser can send a data request to server 104 as a result of a "sort," "drill," or other type of user operation that is performed on the data grid. In these embodiments, the web browser can include an indication of the operation in the request sent to server 104, and the server can determine whether to process the request per block 306 or 308 of FIG. 3 based on one or more rules. Merely by way of example, if the operation is a sort or drill operation (which typically requires a complete refresh of the data in the client viewport), server 104 can process the request per block 308 and thus return an array of M×N blocks (rather than a single block).

In another set of embodiments, the step of determining how much data to fetch (i.e., blocks 306 and 308) can be performed on the client (rather than the server) side. For example, web browser 108-1, 108-2, 108-3 can determine whether the scroll event is a short scroll or a long scroll and request, based on the scroll type, either a single block of data (based on the one or more parameters defining the predetermined block size) or an array of data blocks (based on the one or more parameters defining the predetermined block array size) from application server 104. Server 104 can then service the request as appropriate. One of ordinary skill in the art would recognize other variations, modifications, and alternatives.

With the mechanism described with respect to FIGS. 2 and 3 above, the scrolling performance of a web-based data grid can be optimized across a variety of different scenarios. For example, in the short scroll case, the predetermined data block size parameter(s) can be tuned so that a sufficient (but not excessive) amount of data is requested and received from the server to fill in the portions of the data grid that are not stored on the client. In the long scroll case, the predetermined block array size parameter(s) can be tuned so that the entirety of the client side viewport can be filled with data via a single request/response roundtrip between the client and server. This avoids the latency associated with multiple roundtrips and thus improves application performance and responsiveness.

Figure 4:
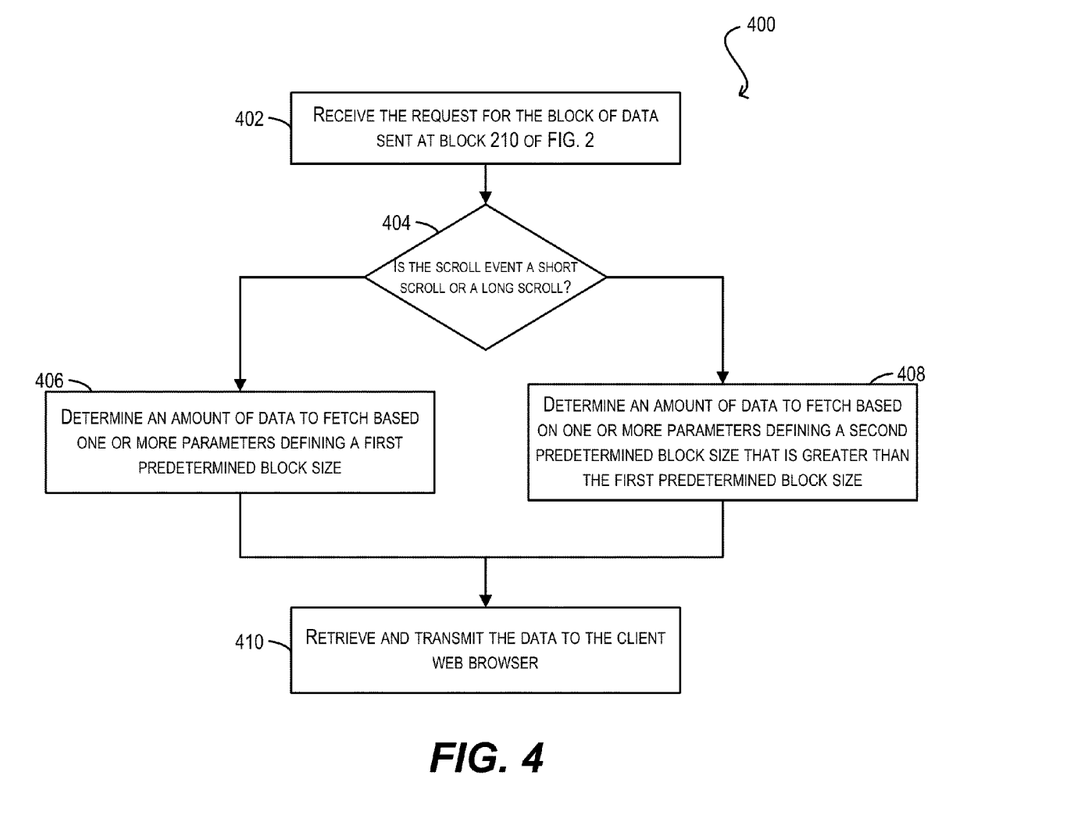
FIG. 4 is a flow diagram of an alternative server-side process for optimizing scrolling performance of a web-based data grid in accordance with an embodiment of the present invention.

FIG. 4 is a flow diagram of an alternative server-side process 400 for optimizing scrolling performance of a web-based data grid in accordance with an embodiment of the present invention. Like process 300 of FIG. 3, process 400 can be carried out by application server 104 of FIG. 1 in response to client-side process 200. Process 400 can be implemented in hardware, software, or a combination thereof. As software, process 400 can be encoded as program code that is stored on a machine-readable storage medium.

At blocks 402 and 404, application server 104 can receive the data block request sent by web browser 108-1, 108-2, or 108-3 at block 210 of FIG. 2, and can determine whether the scroll event performed on the client side is a short scroll or a long scroll.

If the scroll event is a short scroll, application server 104 can determine an amount of data to fetch based on one or more parameters defining a first predetermined data block size (block 406). In various embodiments, this first predetermined data block size can be substantially similar to the predetermined data block size described in block 306 of FIG. 3.

If the scroll event is a long scroll, application server 104 can determine an amount of data to fetch based on one or more parameters defining a second predetermined data block size (i.e., a "megablock") that is different from (and greater than) the first predetermined data block size (block 408). Thus, with this "megablock" approach, the amount of data fetched in the long scroll case does not have to be a multiple of the first predetermined data block size; rather, the amount of data fetched in the long scroll case can be configured to have any arbitrary size that is larger than the first predetermined data block size. This is in contrast to the approach discussed with respect to FIG. 3, where the amount of data fetched in the long scroll case is an array of M×N data blocks.

At block 410, application server 104 can retrieve the amount of data determined at block 406 or 408 and transmit the data to web browser 108-1, 108-2, or 108-3 for refreshing the client viewport.

It should be appreciated that process 400 is illustrative and that variations and modifications are possible. For example, steps described as sequential can be executed in parallel, order of steps can be varied, and steps may be modified, combined, added, or omitted. One of ordinary skill in the art would recognize other variations, modifications, and alternatives.

FIGS. 5-9 are screenshots of a web-based data grid (as presented in a web browser) that illustrate aspects of the processing described with respect to FIGS. 2-4. In these particular examples, the data grid is configured to display a pivot table. However, it should be appreciated that any other type of tabular data structure may be supported.

Figure 5:
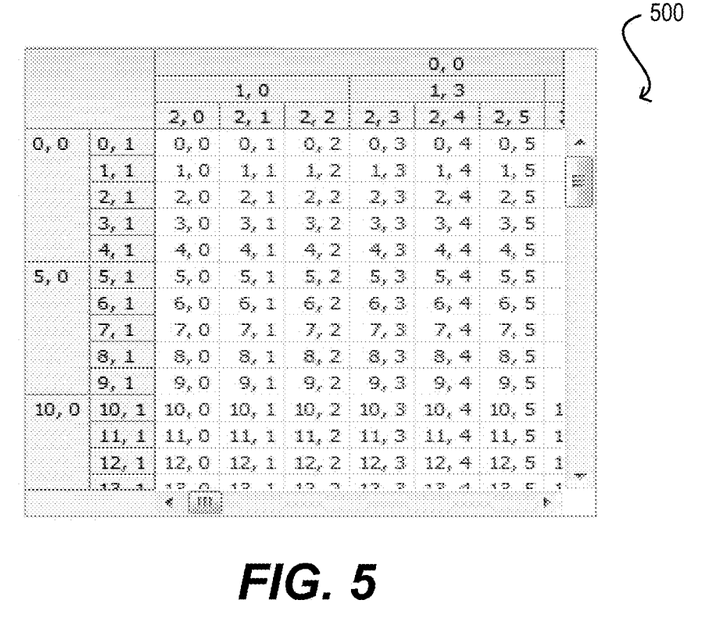
FIGS. 5-9 are screenshots of a web-based data grid in accordance with an embodiment of the present invention.
Figure 6:
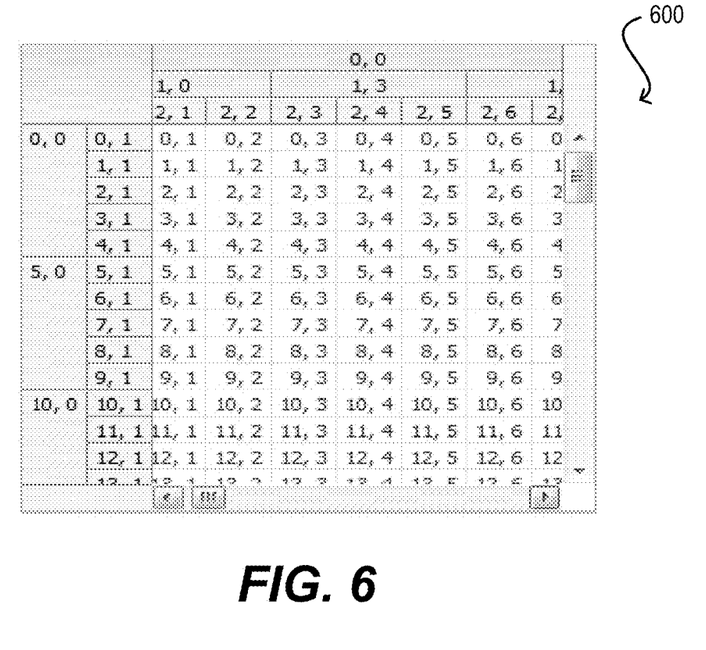

Screenshot 500 of FIG. 5 depicts a data grid within a viewport where the visible portion of the grid is initialized to the top-left corner of the grid. Screenshot 600 of FIG. 6 depicts the data grid of FIG. 5 after a user has performed a short scroll to the right. As shown, part of a new column of data (column "2,7") is now visible on the right-hand side.

Assuming that column "2,7" was not previously cached on the client-side, the client web browser would have sent a data request to the server upon detecting the scroll event, with an indication that the scroll event was a short scroll. In response, the server would have returned a single block of data in order to fill in column "2,7" per the processing of block 306 or 406 of FIG. 3 or 4.

Figure 7:
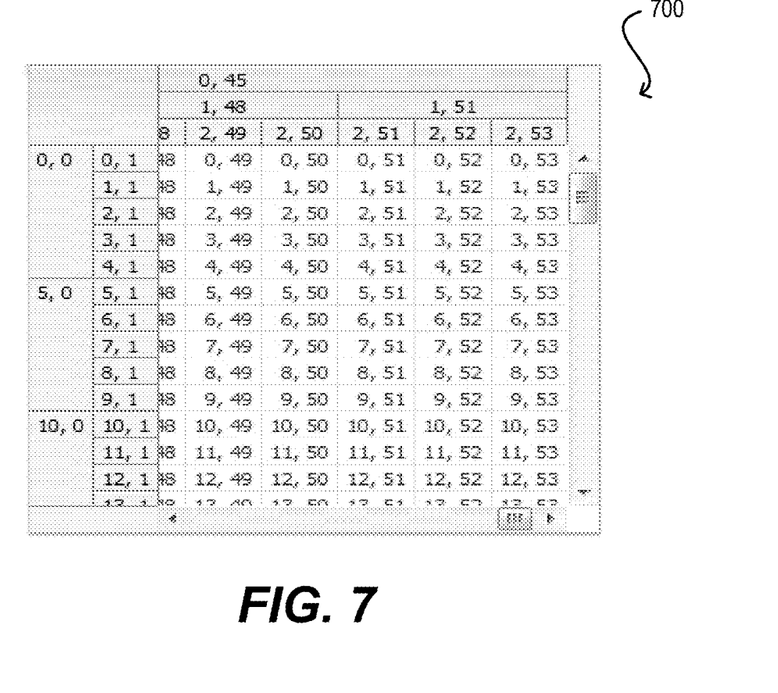

Screenshot 700 of FIG. 7 depicts the data grid of FIG. 5 after the user has performed a long scroll to the right. As shown, the viewport is now filled with entirely new cells/data values. To render the data grid as shown in FIG. 7, the client web browser would have sent a data request to the server upon detecting the scroll event, with an indication that the scroll event was a long scroll. In response, the server would have returned an array of blocks, or a "megablock," per the processing of block 308 or 408 of FIG. 3 or 4.

Figure 8:
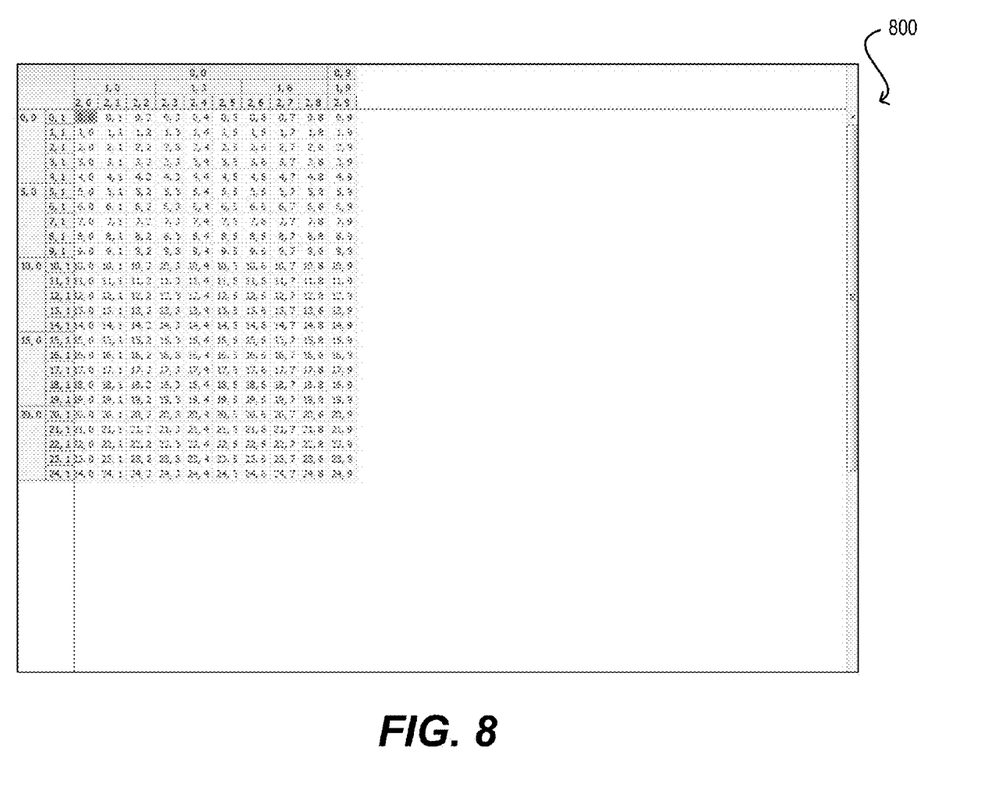
Figure 9:
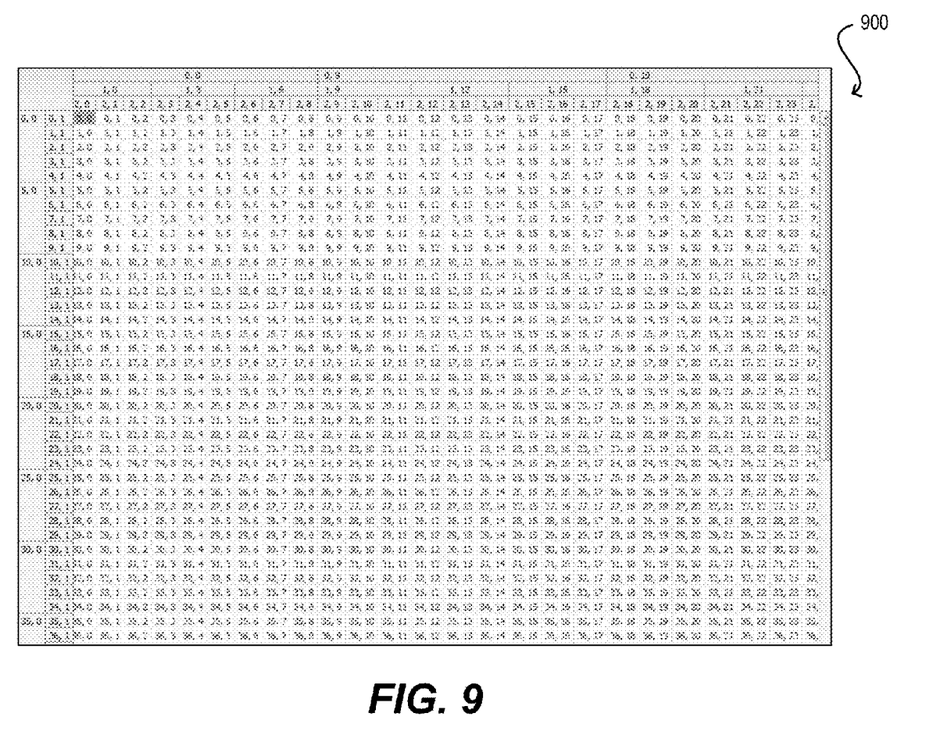

Screenshot 800 of FIG. 8 depicts a data grid within a viewport where parts of the grid have not yet been filled-in with data from the server (and thus are blank). Screenshot 900 of FIG. 9 depicts the same data grid after the blank portions have been populated.

Figure 10:
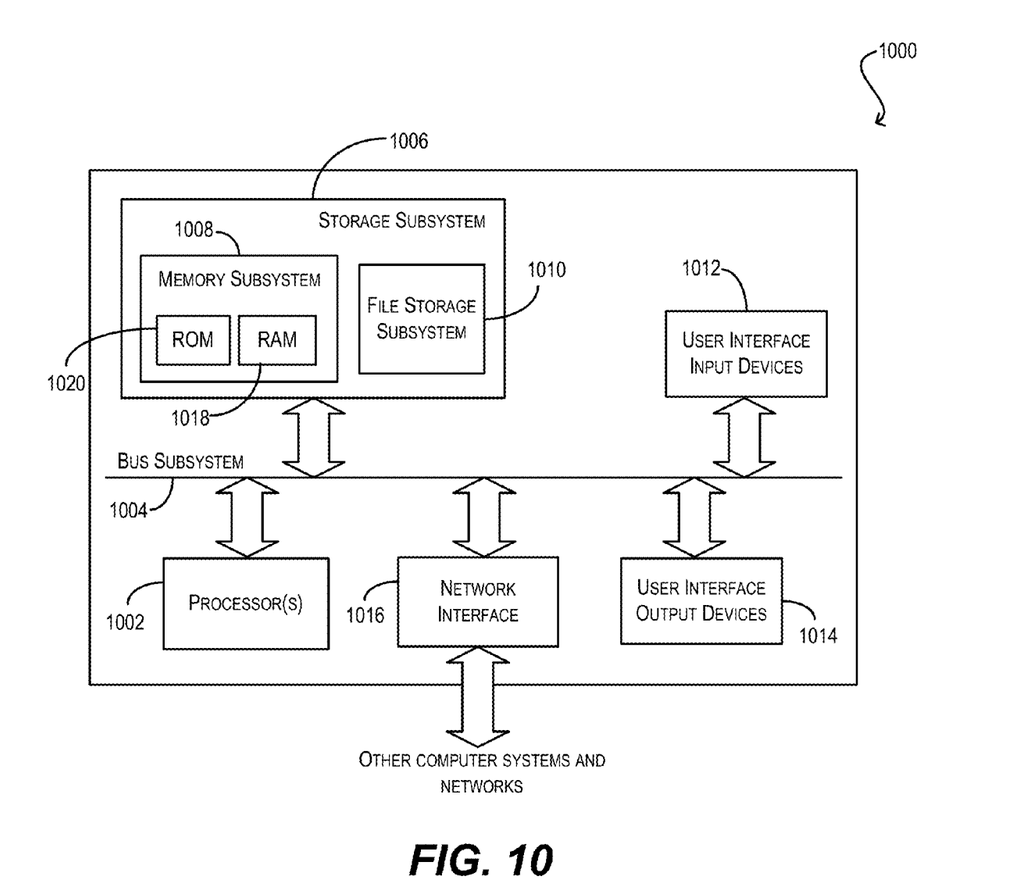
FIG. 10 is a simplified block diagram of a computer system in accordance with an embodiment of the present invention.

FIG. 10 is a simplified block diagram of a computer system 1000 according to an embodiment of the present invention. In one set of embodiments, computer system 1000 can be used to implement any of the entities 102-1, 102-2, 102-3, or 104 described with respect to FIG. 1. As shown in FIG. 10, computer system 1000 can include one or more processors 1002 that communicate with a number of peripheral devices via a bus subsystem 1004. These peripheral devices can include a storage subsystem 1006 (comprising a memory subsystem 1008 and a file storage subsystem 1010), user interface input devices 1012, user interface output devices 1014, and a network interface subsystem 1016.

Bus subsystem 1004 can provide a mechanism for letting the various components and subsystems of computer system 1000 communicate with each other as intended. Although bus subsystem 1004 is shown schematically as a single bus, alternative embodiments of the bus subsystem can utilize multiple busses.

Network interface subsystem 1016 can serve as an interface for communicating data between computer system 1000 and other computer systems or networks (e.g., network 106 of FIG. 1). Embodiments of network interface subsystem 1016 can include an Ethernet card, a modem (telephone, satellite, cable, ISDN, etc.), digital subscriber line (DSL) units, and the like.

User interface input devices 1012 can include a keyboard, pointing devices (e.g., mouse, trackball, touchpad, etc.), a scanner, a barcode scanner, a touch-screen incorporated into a display, audio input devices (e.g., voice recognition systems, microphones, etc.) and other types of input devices. In general, use of the term "input device" is intended to include all possible types of devices and mechanisms for inputting information into computer system 1000.

User interface output devices 1014 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 1000.

Storage subsystem 1006 can include a memory subsystem 1008 and a file/disk storage subsystem 1010. Subsystems 1008 and 1010 represent computer-readable storage media that can store program code and/or data that provide the functionality of embodiments of the present invention.

Memory subsystem 1008 can include a number of memories including a main random access memory (RAM) 1018 for storage of instructions and data during program execution and a read-only memory (ROM) 1020 in which fixed instructions are stored. File storage subsystem 1010 can provide persistent (i.e., non-volatile) storage for program and data files, and can include a magnetic or solid-state hard disk drive, a floppy disk drive along with associated removable media, an optical drive along with associated removable media (e.g., CD-ROM, DVD, Blu-Ray, etc.), a removable flash memory-based drive or card, and/or other types of storage media known in the art.

It is should be appreciated that computer system 1000 is illustrative and not intended to limit embodiments of the present invention. Many other configurations having more or fewer components than system 1000 are possible.

Although specific embodiments of the invention have been described above, various modifications, alterations, alternative constructions, and equivalents are within the scope of the invention. For example, although embodiments of the present invention have been described with respect to certain flow diagrams and steps, it should be apparent to those skilled in the art that the scope of the present invention is not limited to the described diagrams/steps.

Further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A non-transitory computer readable medium having stored thereon program code executable by a processor, the program code comprising:
    code that causes the processor to receive, from a client computer system, a request for data in response to a scroll event performed by a user of the client computer system with respect to a data grid, the request including an indication of whether the scroll event is a short scroll or a long scroll;
    if the scroll event is a short scroll, code that causes the processor to retrieve, in response to the request, a first amount of data based on one or more first parameters defining a predetermined block size; and
    if the scroll event is a long scroll, code that causes the processor to retrieve, in response to the request, a second amount of data based on the one or more first parameters defining the predetermined block size and one or more second parameters defining a predetermined block array size, wherein the code that causes the processor to retrieve the second amount of data based on the one or more first parameters and the one or more second parameters comprises:
        code that causes the processor to determine a size of the second amount of data by multiplying the predetermined block size by the predetermined block array size; and
        code that causes the processor to retrieve the second amount of data based on the determined size.

2. The non-transitory computer readable medium of claim 1 wherein the data grid comprises a plurality of cells.

3. The non-transitory computer readable medium of claim 2 wherein the one or more first parameters define the predetermined block size as a set of JxK cells.

4. The non-transitory computer readable medium of claim 3 wherein the one or more second parameters define the predetermined block array size as a set of MxN blocks, each block comprising JxK cells.

5. The non-transitory computer readable medium of claim 1 wherein the request further includes a starting position for the data within the data grid.

6. The non-transitory computer readable medium of claim 1 wherein the data grid is a pivot table.

7. The non-transitory computer readable medium of claim 1 wherein the data grid is part of a web application.

8. A method comprising:
    rendering, by a client computer system, a data grid in a viewport of a web browser;
    detecting, by the client computer system, a scroll event performed by a user with respect to the data grid;

determining, by the client computer system, that a first portion of the data grid visible in the viewport as a result of the scroll event needs to be populated with data from a server computer system;

if any portion of the data grid visible in the viewport as a result of the scroll event overlaps one or more data blocks stored on the client computer system, determining that the scroll event is a short scroll;

if no portion of the data grid visible in the viewport as a result of the scroll event overlaps one or more data blocks stored on the client computer system:
- determining that the scroll event is a long scroll; and
- determining a size of an amount of data by multiplying a predetermined block size by a predetermined block array size;

sending, by the client computer system to a server computer system, a request for a data block for populating the first portion of the data grid, the request including an indication of whether the scroll event is a short scroll or a long scroll, wherein if the scroll event is a long scroll, the size of the amount of data is included in the request.

9. The method of claim 8 wherein determining whether the scroll event is a short scroll or a long scroll comprises determining whether any portion of the data grid visible in the viewport as a result of the scroll event overlaps one or more data blocks stored on the client computer system.

10. The method of claim 8 wherein the viewport includes a horizontal scrollbar or a vertical scrollbar, and wherein the scroll event is performed by operating the horizontal scrollbar or the vertical scrollbar.

11. A system comprising:
a processor configured to:
- receive, from a client computer system, a request for data in response to a scroll event performed by a user of the client computer system with respect to a data grid, the request including an indication of whether the scroll event is a short scroll or a long scroll;
- if the scroll event is a short scroll, retrieve, in response to the request, a first amount of data based on one or more first parameters defining a first predetermined block size; and
- if the scroll event is a long scroll:
  - retrieve, in response to the request, a second amount of data based on a second predetermined block size distinct from the first predetermined block size, the second predetermined block size being the first predetermined block size multiplied by a predetermined block array size.

12. The system of claim 11 wherein the data grid comprises a plurality of cells.

13. The system of claim 11 wherein the second predetermined block size is greater than the first predetermined block size.

14. The system of claim 11 wherein the data grid is a pivot table.

15. The system of claim 11 wherein the data grid is part of a web application.

* * * * *